(12) United States Patent
Ji et al.

(10) Patent No.: US 10,686,749 B2
(45) Date of Patent: Jun. 16, 2020

(54) PACKET SENDING METHOD AND NETWORK DEVICE

(71) Applicant: Huawei Technologies Co., Ltd., Shenzhen (CN)

(72) Inventors: Lingling Ji, Nanjing (CN); Jiuyong Li, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/269,023

(22) Filed: Feb. 6, 2019

(65) Prior Publication Data
US 2019/0253381 A1 Aug. 15, 2019

(30) Foreign Application Priority Data
Feb. 11, 2018 (CN) .......................... 2018 1 0140153

(51) Int. Cl.
*H04L 29/12* (2006.01)
*H04L 12/939* (2013.01)
*H04L 12/707* (2013.01)
*H04L 12/703* (2013.01)
*H04L 12/709* (2013.01)

(52) U.S. Cl.
CPC ............ *H04L 61/103* (2013.01); *H04L 45/22* (2013.01); *H04L 45/245* (2013.01); *H04L 45/28* (2013.01); *H04L 49/557* (2013.01); *H04L 61/6022* (2013.01)

(58) Field of Classification Search
CPC ... H04L 61/103; H04L 61/6022; H04L 45/28; H04L 49/557; H04L 45/22; H04L 45/245; H04L 29/06027; H04L 29/12481; H04L 45/3065; H04L 45/502; H04L 47/20; H04L 47/22; H04L 29/12349; H04L 47/2416; H04L 47/2441; H04L 61/2557; H04L 65/608; H04L 65/80; H04L 65/1006

See application file for complete search history.

(56) References Cited

U.S. PATENT DOCUMENTS

2012/0033541 A1  2/2012  Da Silva et al.
2016/0149725 A1  5/2016  Yang et al.

OTHER PUBLICATIONS

Foreign Communication From a Counterpart Application, European Application No. 19156337.8, Extended European Search Report dated May 23, 2019, 8 pages.

*Primary Examiner* — Jung Liu
(74) *Attorney, Agent, or Firm* — Conley Rose, P.C.

(57) ABSTRACT

This application provides a packet sending method and a network device, where a first network device in a multi-chassis link aggregation group is coupled to a user-side device using a first port, and is coupled to a second network device in the multichassis link aggregation group using a second port. The first network device configures a first preset Address Resolution Protocol (ARP) entry for the user-side device when the first port and the second port have not become faulty, and when the first port becomes faulty, can directly forward a packet whose destination is the user-side device to the second network device using the second port and the first preset ARP entry. Then, the second network device forwards the packet to the user-side device.

20 Claims, 8 Drawing Sheets

PACKET SENDING METHOD AND NETWORK DEVICE

CROSS-REFERENCE TO RELATED APPLICATION

This application claims priority to Chinese Patent Application No. 201810140153.4 filed on Feb. 11, 2018, which is hereby incorporated by reference in its entirety.

TECHNICAL FIELD

This application relates to the field of computer and communications technologies, and in particular, to a packet sending method and a network device.

BACKGROUND

A multichassis link aggregation group (also referred to as M-LAG) is a multichassis layer 2 port virtualization technology. This technology allows performing multichassis link aggregation on a user-side device and two devices that form active-active gateways, and improves service reliability of the user-side device. The user-side device may be a relay device providing a data forwarding function, or may be lower-layer user device.

As shown in FIG. 1, FIG. 1 is a network topology to which an M-LAG technology is applied. A layer 3 switch A and a layer 3 switch B are multichassis link aggregation devices, and the two switches form active-active gateways. A server E and a server D are user-side devices, and the two servers are dual-homed to the switch A and the switch B. The switch A and the switch B each provide an M-LAG interface (not shown in the figure) externally, and are separately connected to the server E and the server D using the M-LAG interface. Dual-homing means that a server is connected to two different gateways. Active-active means that both two gateways can be used for traffic forwarding. Further, a peer-link link (peer link) is deployed between the switch A and the switch B to forward horizontal service traffic between the switch A and the switch B. Ports, connected to the peer link, of the switch A and the switch B are both peer-link ports. In the foregoing network topology, the server E and the server D are connected to a network in a manner of multichassis link aggregation, to implement dual-homed and active-active access of the server E and the server D.

As shown in FIG. 1, the switch A and the switch B form active-active gateways, and therefore uplink traffic of the server E or the server D can arrive at the switch C and an uplink network regardless of whether the uplink traffic passes through the switch A or the switch B. When a link fault occurs on one device in the active-active gateways, for example, a link between the switch A and the server E becomes faulty, downlink traffic destined for the server E and received by the switch C may be switched to the switch B using a peer link after being forwarded to the switch A, and then arrives at the server E through layer 2 forwarding by the switch B. It can be learned that when a link fault occurs on one device of the active-active gateways, normal service operation can be ensured using the other device, thereby effectively improving communication reliability of a network structure formed using the M-LAG technology.

However, in the network shown in FIG. 1, when the link between the switch A and the server E becomes faulty, the switch A continues to send data to the server E using an M-LAG port of the switch A and the link between the switch A and the server E in a period of time. Therefore, packet loss is caused.

In addition, in a dual-homed and active-active status, to avoid a loop, it is specified that the switch B cannot forward traffic that is received on a peer link, that is, the switch B cannot perform layer 2 forwarding. When a link fault is recovered, for example, when the link between the switch A and the server E becomes normal, the switch B cannot perform layer 2 forwarding any longer. However, the switch A cannot normally forward data to the server E in a period of time, and packet loss consequently occurs in this period of time.

In conclusion, in a network formed using the M-LAG technology, how to reduce a quantity of lost data packets when a link fault occurs and the link fault is recovering is a technical problem that needs to be urgently resolved.

SUMMARY

This application provides a packet sending method and a network device to configure a first preset Address Resolution Protocol (ARP) entry for a user-side device when a first port and a second port of a first network device have not become faulty, and directly forward data to a second network device using the second port and the first preset ARP entry when the first port becomes faulty such that the second network device forwards the data to the user-side device. This saves a first-preset-ARP-entry learning process that is to be performed after the first port becomes faulty, and effectively reduces a quantity of lost data packets. In addition, a media access control (MAC) address in the first preset ARP entry is set to be a MAC address of the second network device in this application. As a result, when receiving the data forwarded by the first network device, the second network device performs layer 3 forwarding. This overcomes a disadvantage of packet loss caused because the second network device cannot perform layer 2 forwarding in a link fault recovery process.

According to a first aspect, this application provides a packet sending method to forward data to a user-side device using one multichassis link aggregation device in a multichassis link aggregation group when another multichassis link aggregation device becomes faulty.

Further, a first network device in a multichassis link aggregation group receives a first packet, where a destination Internet Protocol (IP) address of the first packet is an IP address of a user-side device, and the first network device is connected to the user-side device using a first port.

When the first port becomes faulty, the first network device modifies a destination MAC address of the first packet to a MAC address of a second network device in the multichassis link aggregation group based on a first preset ARP entry of the user-side device to obtain a second packet. The first network device is connected to the second network device using a second port, and the first preset ARP entry includes the MAC address of the second network device. The first network device and the second network device are multichassis link aggregation devices, the two devices form active-active gateways, and are connected using a peer link. The user-side device is lower-layer user device of the first network device. The first port is an M-LAG port of the first network device, and the second port is a peer-link port of the first network device. The second port is an emergency data port of the first port, and the corresponding second port may be determined based on the first port. In addition, the second network device is connected to the user-side device using an M-LAG port of the second network device, and is connected to the peer link using a peer-link port of the second network device. A link connecting the first port and the user-side device is an active link, and the peer link connecting the second port to the second network device and a link connecting the second network device and the user-side device are standby links.

The first network device sends the second packet to the second network device through the second port, where the second packet is used for the second network device to obtain a third packet based on the second packet and send the third packet to the user-side device, a destination IP address of the second packet is the IP address of the user-side device, and a destination MAC address of the third packet is a MAC address of the user-side device. After receiving the second packet, the second network device detects that a destination MAC address of the second packet is the MAC address of the second network device, and determines that the second network device needs to perform layer 3 forwarding. Then, the second network device obtains the destination IP address of the second packet, namely, the IP address of the user-side device. The second network device performs IP address resolution to obtain the MAC address of the user-side device. To be specific, the second network device obtains the MAC address of the user-side device based on the IP address of the user-side device. Finally, the second network device modifies the destination MAC address of the second packet to the MAC address of the user-side device to obtain the third packet.

In this application, when the active link has not become faulty, the first preset ARP entry is configured for the user-side device. When the active link becomes faulty, data may be directly forwarded to the second network device using the second port and the already configured first preset ARP entry, without a need to perform first-preset-ARP-entry learning. Then, the second network device forwards the data to the user-side device. This saves an ARP entry learning process and effectively reduces a quantity of lost packets when the active link becomes faulty.

With reference to the first aspect, in a first possible implementation, before the receiving, by a first network device, the first packet, the packet sending method further includes generating, by the first network device, a second preset ARP entry of the user-side device, where the second preset ARP entry includes the IP address of the user-side device, the MAC address of the user-side device, and an identifier of the first port, and the second preset ARP entry is an ARP entry for which an egress port is the first port, and when the first network device determines that the first port is a member port of the multichassis link aggregation group, generating, by the first network device, the first preset ARP entry based on the second preset ARP entry, where the first preset ARP entry further includes the IP address of the user-side device and an identifier of the second port, and the first preset ARP entry is an ARP entry for which an egress port is the second port.

In this application, when the active link has not become faulty, the first preset ARP entry and the second preset ARP entry are configured for the user-side device in advance. When the active link becomes faulty, a process of learning the first preset ARP entry can be saved and a quantity of lost data packets is effectively reduced.

With reference to the first aspect or the first possible implementation of the first aspect, in a second possible implementation, the first port becoming faulty includes that the first port itself becomes faulty or a link between the first port and the user-side device becomes faulty.

With reference to the first aspect or the first possible implementation of the first aspect, in a third possible implementation, the method further includes receiving, by the first network device, a fourth packet in a specified time period after a fault of the first port recovers, where a destination IP address of the fourth packet is the IP address of the user-side device, and the specified time period is a time period between a moment at which a fault of the first port recovers and a moment at which learning of the ARP entry for which the egress port is the first port is completed, modifying, by the first network device, a destination MAC address of the fourth packet to the MAC address of the second network device based on the first preset ARP entry, to obtain a fifth packet, and sending, by the first network device, the fifth packet to the second network device through the second port, where the fifth packet is used for the second network device to obtain a sixth packet based on the fifth packet and send the sixth packet to the user-side device, a destination MAC address of the sixth packet is the MAC address of the user-side device, and a destination IP address of the fifth packet is the IP address of the user-side device. That the fifth packet is used for the second network device to obtain a sixth packet based on the fifth packet includes that after receiving the fifth packet, the second network device detects that a destination MAC address of the fifth packet is the MAC address of the second network device, and determines that the second network device needs to perform layer 3 forwarding. Then, the second network device obtains the destination IP address of the fifth packet, namely, the IP address of the user-side device, and performs IP address resolution to obtain the MAC address of the user-side device. To be specific, the second network device obtains the MAC address of the user-side device based on the IP address of the user-side device. Finally, the second network device modifies the destination MAC address of the fifth packet to the MAC address of the user-side device, to obtain the sixth packet.

In this application, the MAC address of the fifth packet is set to be the MAC address of the second network device, and when receiving the fifth packet sent by the first network device, the second network device needs to perform layer 3 forwarding, instead of layer 2 forwarding. In this way, the data continues to be forwarded to the user-side device using a standby link in an active-link fault recovery process. Therefore, this overcomes a disadvantage of packet loss caused because the second network device cannot perform layer 2 forwarding in the active-link fault recovery process. The active-link fault recovery process indicates the specified time period after a fault of the first port recovers.

According to a second aspect, this application further provides a network device, where the network device includes units and components configured to perform steps of the method in the first aspect and the implementations of the first aspect.

According to a third aspect, this application further provides another network device, where the network device is a first network device in a multichassis link aggregation group, and the network device includes a first port configured to connect to a user-side device, a second port configured to connect to a second network device in the multichassis link aggregation group, a memory configured to store program code, and a processor configured to invoke the program code to implement the method in the first aspect and the implementations of the first aspect.

According to a fourth aspect, this application further provides a computer storage medium, where the computer storage medium may store a program, and when the program is executed, the method in the first aspect and the implementations of the first aspect can be implemented.

According to a fifth aspect, this application further provides a computer program product including instructions, when the computer program product runs on a computer, the computer performs the method in the first aspect and the implementations of the first aspect.

In the foregoing technical solutions of this application, when the first port and the second port of the first network device have not become faulty, that is, before the active link becomes faulty, the first preset ARP entry is configured for the user-side device. When the active link becomes faulty, the data is directly forwarded to the second network device using the second port and the already configured first preset ARP entry, without a need to spend time in generating an ARP entry for the user-side device. Then, the second network device forwards the data to the user-side device. This avoids performing an ARP entry learning process after the first port becomes faulty, and effectively reduces a quantity of lost packets. In addition, the MAC address in the first preset ARP entry is set to be the MAC address of the second network device in this application. When the data is forwarded using the second network device, layer 3 forwarding is performed, to overcome a disadvantage of packet loss caused because the second network device cannot perform layer 2 forwarding in an active-link fault recovering process. In conclusion, in this application, the quantity of lost data packets can be effectively reduced when the active link becomes faulty and in a fault recovering process.

DESCRIPTION OF EMBODIMENTS

The following clearly describes the technical solutions in the embodiments of this application with reference to the accompanying drawings in the embodiments of this application. The described embodiments are some but not all of the embodiments of this application. All other embodiments obtained by a person of ordinary skill in the art based on the embodiments of this application without creative efforts shall fall within the protection scope of this application.

Before the technical solutions of the embodiments of this application are described, technical scenarios of this application are described first. The technical solutions of the embodiments of this application are all applied to the following technical scenarios.

A network structure to which an M-LAG technology is applied includes at least two multichassis link aggregation devices and a user-side device connected to the at least two multichassis link aggregation devices. The multichassis link aggregation device is usually a network device providing a routing function, for example, it may be a layer 3 switch. The at least two multichassis link aggregation devices form active-active or multi-active gateways. When any one of the devices becomes faulty, data can be continued to be forwarded using another device. The user-side device may be a relay device providing a data forwarding function, or may be lower-layer user device, such as a server.

In subsequent embodiments of this application, active-active gateways formed by two multichassis link aggregation devices are used as an example for detailed description. A peer link is deployed between the two multichassis link aggregation devices to connect the multichassis. Ports, connected to the peer link, of the two multichassis link aggregation devices are both peer-link ports. Both the two multichassis link aggregation devices are connected to the user-side device using M-LAG ports of the two multichassis link aggregation devices.

Figure 1:
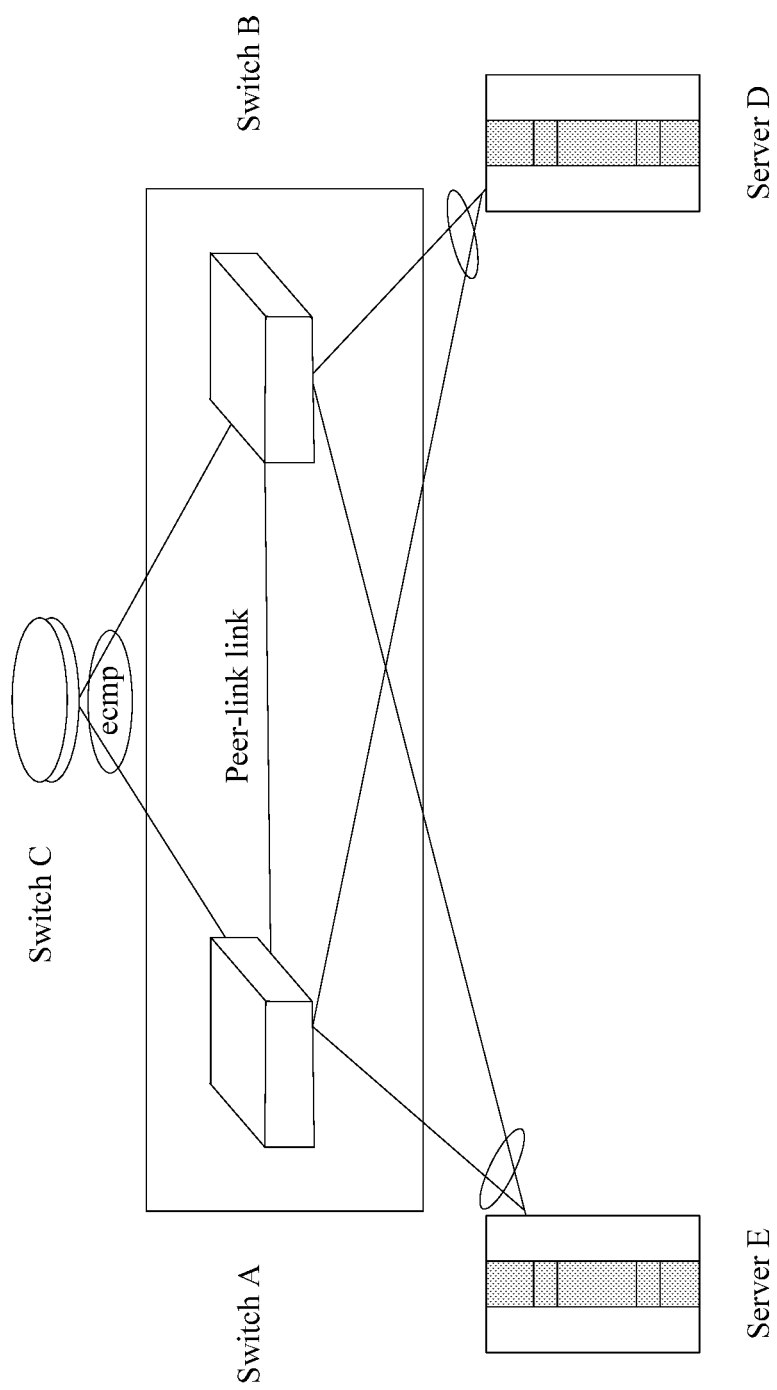
FIG. 1 shows an example of a schematic diagram of a network structure in dual-homing and active-active networking.
Figure 2:
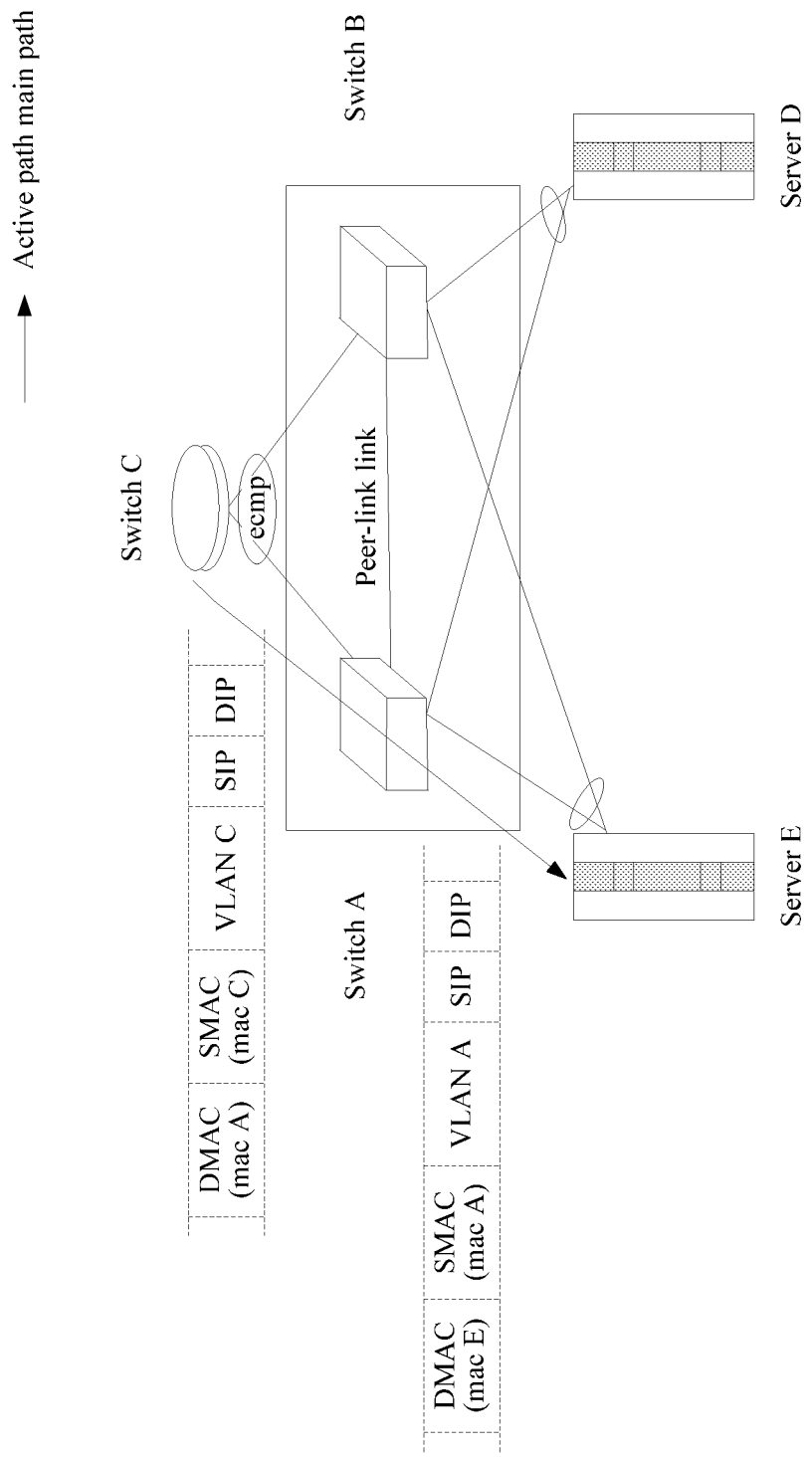
FIG. 2 shows an example of a schematic diagram of sending data using an active link in dual-homing and active-active networking.
Figure 3:
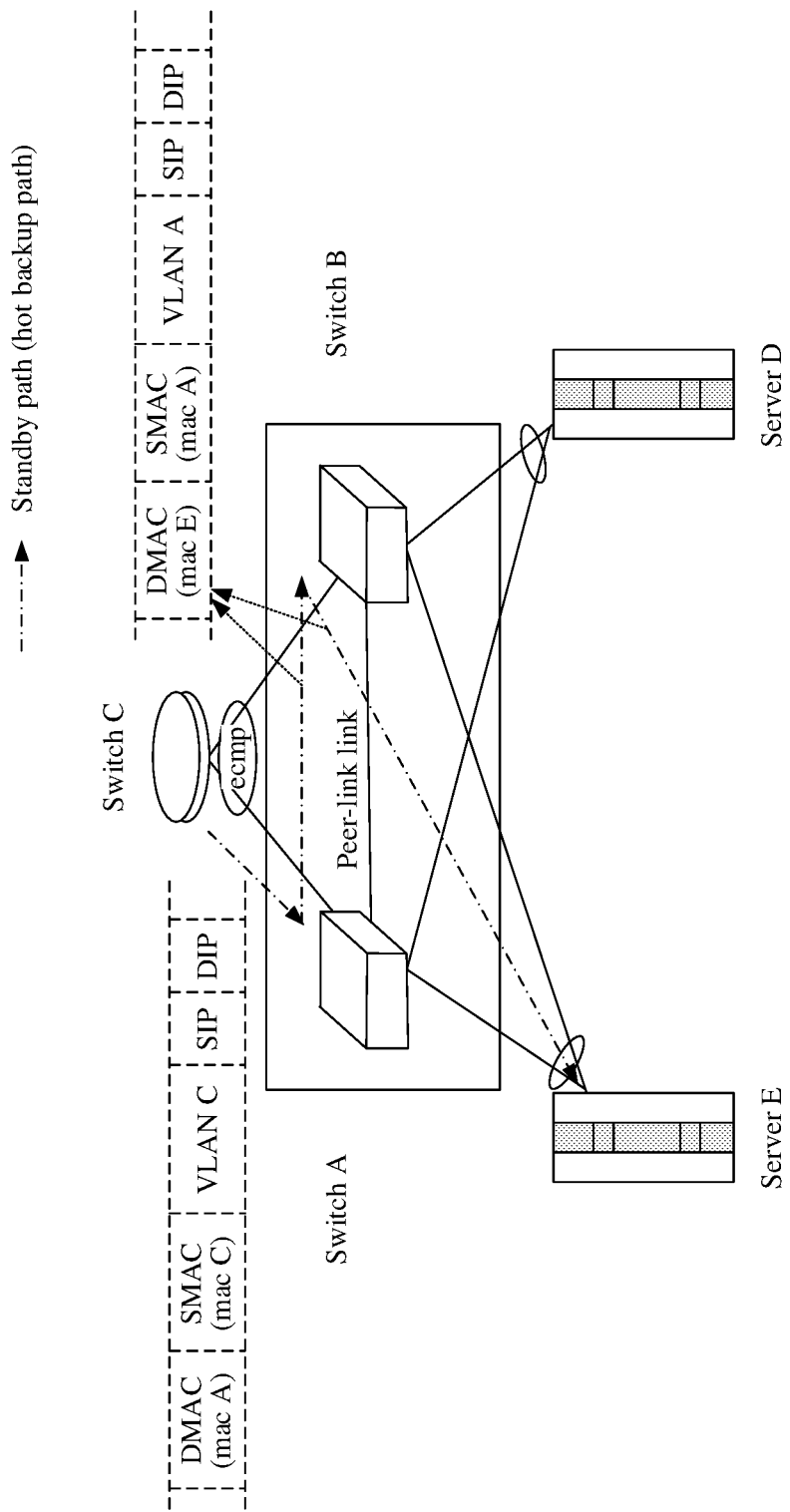
FIG. 3 shows an example of a schematic diagram of sending data using a standby link in dual-homing and active-active networking.

As shown in FIG. 2 and FIG. 3, a switch A and a switch B form active-active gateways, and a server E and a server D are user-side devices. Assuming that a destination address of data arriving at the switch A is the server E, a link between the switch A and the server E is an active link, a peer link between the switch A and the switch B and a link between the switch B and the server E are a standby link. When the active link becomes faulty, the standby link may be used to forward the data.

As shown in FIG. 2, when the data is sent using the active link, a destination MAC address of a packet sent by the switch A to the server E is a MAC address of the server E, and a destination IP address of the packet is an IP address of the server E. As shown in FIG. 3, when the active link becomes faulty and the standby link is used to send the data, a destination MAC address of a packet sent on the standby link is also the MAC address of the server E, and a destination IP address of the packet is also the IP address of the server E. That is, the packet sent on the standby link and the packet sent on the active link are the same in this application, and the switch A and the switch B are considered as a same data forwarding node for forwarding data in this application.

When the active link becomes faulty (that is, the server E changes from dual-homed to single-homed), the switch A sends an ARP probe packet, and updates an ARP entry based on feedback information for the ARP probe packet, updates an egress port of the ARP entry from the active link to a peer-link port of the switch A by ARP learning, and then forwards downlink traffic using the peer link to ensure normal service operation on a network. However, before updating the egress port of the active link to the peer-link port, the switch A continues to send the downlink traffic to the server E using the egress port of the active link, causing packet loss on the downlink traffic. If there are a lot of ARP entries for the egress port of the active link, the switch A needs to wait until all the ARP entries for the egress port of the active link are updated, before forwarding the downlink traffic using the ARP entry for the peer-link port. Therefore, as a quantity of ARP entries for the egress port of the active link increases, more packets are lost on the downlink traffic.

In addition, in a multichassis link aggregation scenario, layer 2 traffic forwarding between the egress port of the peer link and the M-LAG port (that is, M-LAG ports of the multichassis link devices) in an active-active state is blocked to avoid a layer 2 loop. That is, to-be-forwarded layer 2 traffic received through the egress port of the peer link cannot be forwarded using the M-LAG ports in the active-active state, regardless of whether the traffic is traffic to be unicast, broadcast, or multicast. In such a control manner, when a fault of the active link recovers (that is, the server E changes from single-homed to dual-homed), the switch A cannot continue to forward the traffic using the switch B any longer. However, ARP entry learning has not been completed on the M-LAG port of the switch A at that time, and the traffic cannot be forwarded using the recovered active link, thereby causing packet loss on the downlink traffic. In addition, as a quantity of ARP entries that needs to be learned increases, more packets are lost on the downlink traffic.

In conclusion, in a network to which the M-LAG technology is applied, a technical problem of downlink packet loss always exists regardless of when a link fault occurs or when the link fault is recovering.

Figure 4:
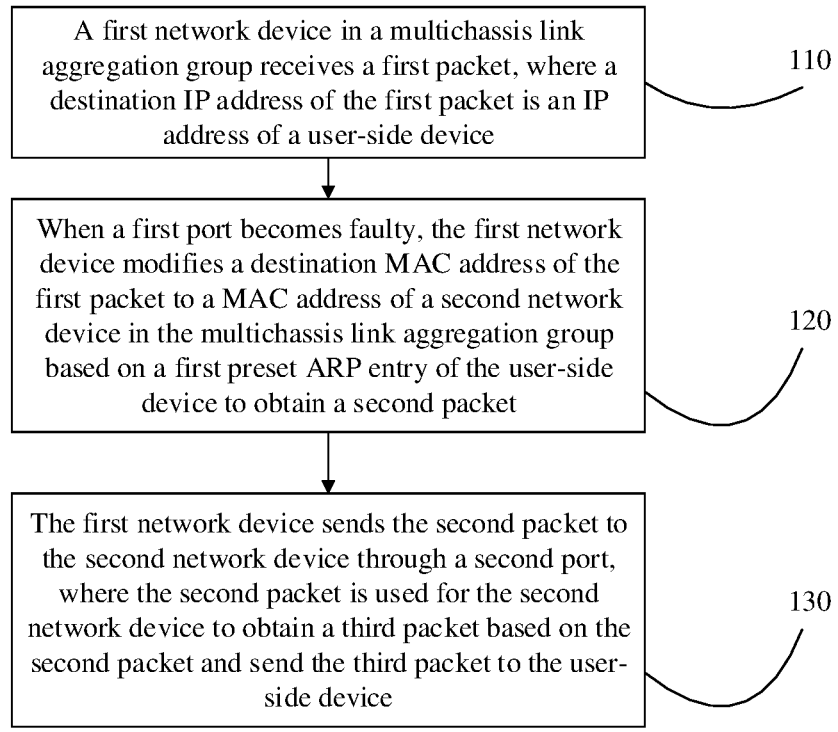
FIG. 4 shows an example of a flowchart of a packet sending method according to an embodiment of this application.

To resolve the foregoing problem of packet loss, an embodiment of this application provides a packet sending method. The method is used to forward data to a user-side device using one multichassis link aggregation device in a multichassis link aggregation group when another multichassis link aggregation device becomes faulty. As shown in FIG. 4, the packet sending method in this embodiment includes the following steps.

Step 110: A first network device in a multichassis link aggregation group receives a first packet, where a destination IP address of the first packet is an IP address of a user-side device, and the first network device is connected to the user-side device using a first port.

The first packet includes data to be forwarded to the user-side device.

Step 120: When the first port becomes faulty, the first network device modifies a destination MAC address of the first packet to a MAC address of a second network device in the multichassis link aggregation group based on a first preset ARP entry of the user-side device to obtain a second packet, where the first network device is connected to the second network device using a second port, and the first preset ARP entry includes the MAC address of the second network device.

The first network device and the second network device are multichassis link aggregation devices, the two devices form active-active gateways, and are connected through a peer link. The user-side device is lower-layer user device of the first network device. The first port is an M-LAG port of the first network device, and the second port is a peer-link port of the first network device. The second port is an emergency data port of the first port. The emergency data port is a port used to replace a data transmission port to forward data when the data transmission port corresponding to the emergency data port cannot normally send and receive data. There is a correspondence between the first port and the second port herein, and the corresponding second port may be determined based on the first port. It should be noted that the second port herein is an emergency data port of the first port in an M-LAG networking mode.

In addition, the second network device is connected to the user-side device using an M-LAG port of the second network device, and is connected to the peer link using a peer-link port of the second network device. A link connecting the first port and the user-side device is an active link, and the peer link connecting the second port to the second network device and a link connecting the second network device and the user-side device are standby links.

The first port becoming faulty includes that the first port itself becomes faulty or a link between the first port and the user-side device becomes faulty.

That the first network device modifies the destination MAC address of the first packet to the MAC address of a second network device based on the first preset ARP entry includes the first network device obtains the MAC address of the second network device from the first preset ARP entry, and then the first network device modifies the destination MAC address of the first packet to the MAC address of the second network device.

Step 130: The first network device sends the second packet to the second network device through the second port, where the second packet is used for the second network device to obtain a third packet based on the second packet and send the third packet to the user-side device, a destination MAC address of the third packet is a MAC address of the user-side device, and a destination IP address of the second packet is the IP address of the user-side device.

That the second packet is used for the second network device to obtain a third packet based on the second packet includes after receiving the second packet, the second network device detects that a destination MAC address of the second packet is the MAC address of the second network device, and determines that the second network device needs to perform layer 3 forwarding. Then, the second network device obtains the destination IP address of the second packet, namely, the IP address of the user-side device. The second network device performs IP address resolution to obtain the MAC address of the user-side device. To be specific, the second network device obtains the MAC address of the user-side device based on the IP address of the user-side device. Finally, the second network device modifies the destination MAC address of the second packet to the MAC address of the user-side device to obtain the third packet.

In this embodiment, when the active link has not become faulty, the first preset ARP entry is configured for the user-side device. When the active link becomes faulty, data may be directly forwarded to the second network device using the second port and the already configured first preset ARP entry, without a need to learn the first preset ARP entry. Then, the second network device forwards the data to the user-side device. This saves an ARP entry learning process and effectively reduces a quantity of lost packets when the active link becomes faulty. The data herein includes a packet.

In addition, the first preset ARP entry of the user-side device includes the MAC address of the second network device, and therefore after receiving the packet forwarded by the first network device, the second network device performs layer 3 forwarding. During layer 3 forwarding, the second network device determines the MAC address of the user-side device based on the IP address of the user-side device, and then forwards the packet to the user-side device based on the MAC address of the user-side device. Layer 3 data forwarding overcomes a disadvantage that the second network device cannot be used for data forwarding in an active-link fault recovering process, and therefore no downlink data packet is lost in the active-link fault recovering process.

Figure 5:
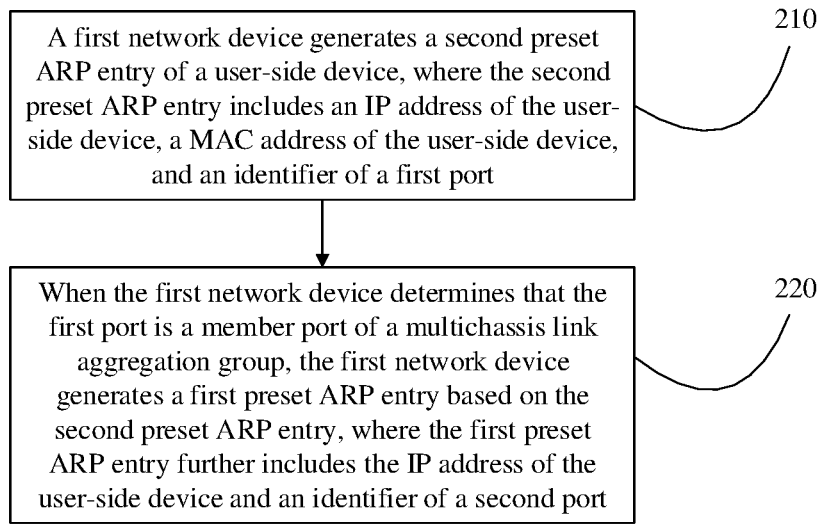
FIG. 5 shows an example of a flowchart of a packet sending method according to another embodiment of this application.

In an embodiment, before the first network device receives the first packet, the packet sending method further includes a process of generating the first preset ARP entry. As shown in FIG. 5, the process includes the following steps.

Step 210: The first network device generates a second preset ARP entry of the user-side device, where the second preset ARP entry includes the IP address of the user-side device, the MAC address of the user-side device, and an identifier of the first port.

The second preset ARP entry is an ARP entry for which an egress port is the first port. It should be noted that an ARP entry is set for each port, and a network device obtains a corresponding ARP entry based on an IP address of a target device carried in a packet or data, and then obtains a packet or data forwarding port and a MAC address of the target device based on the ARP entry. Then, the network device forwards, based on the MAC address of the target device, the packet and the data to the target device using the packet or data forwarding port.

That the first network device generates a second preset ARP entry of the user-side device includes that the first network device sends an ARP probe packet to the user-side device using the first port, obtains the IP address of the user-side device and the MAC of the user-side device based on information fed back by the user-side device, and then generates or updates the second preset ARP entry based on the IP address of the user-side device, the MAC of the user-side device, and the identifier of the first port.

Step 220: When the first network device determines that the first port is a member port of the multichassis link aggregation group, the first network device generates the first preset ARP entry based on the second preset ARP entry, where the first preset ARP entry further includes the IP address of the user-side device and an identifier of the second port.

The first preset ARP entry is an ARP entry for which an egress port is the second port.

The member port of the multichassis link aggregation group is a port of a multichassis link aggregation device in the multichassis link aggregation group, and is a port connected to the user-side device using a specific link. That is, the member port of the multichassis link aggregation group is an M-LAG port of the multichassis link aggregation device.

That the first network device generates the first preset ARP entry based on the second preset ARP entry includes that the first network device sends an ARP probe packet to the user-side device using the second port, and obtains the MAC address of the second network device based on information fed back by the user-side device, then the first network device obtains the IP address of the user-side device from the second preset ARP entry, finally, the first network device generates or updates the first preset ARP entry based on the IP address of the user-side device, the MAC address of the second network device, and the identifier of the second port.

In this embodiment, when the first port and the second port have not become faulty, the first preset ARP entry and the second preset ARP entry are configured in advance for the user-side device. When the active link becomes faulty, this can save a process of learning the first preset ARP entry and effectively reduce a quantity of lost data packets.

Figure 6:
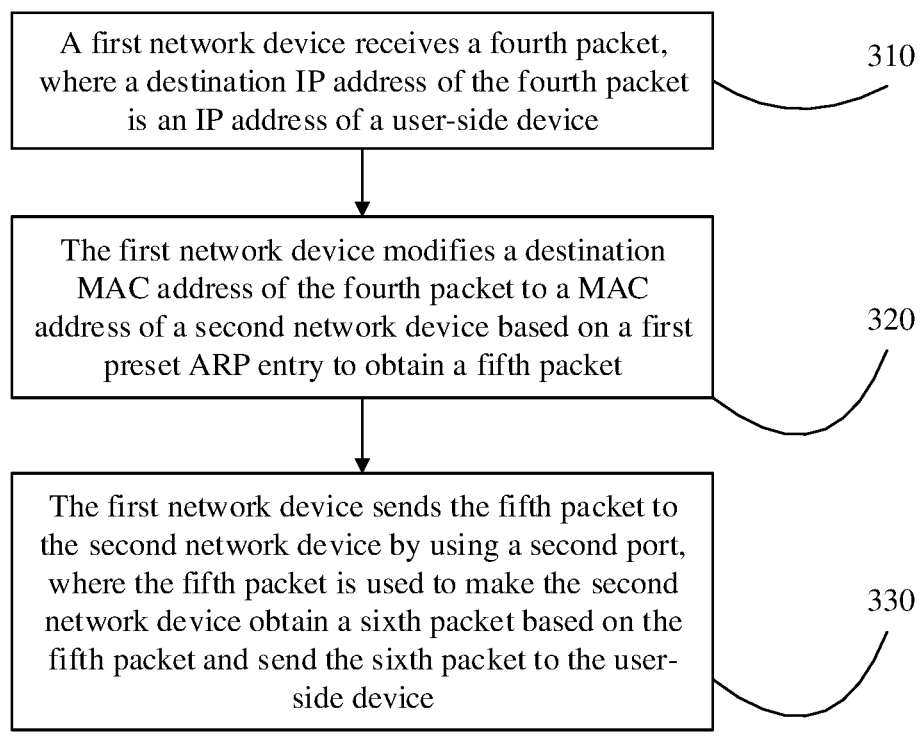
FIG. 6 shows an example of a flowchart of a packet sending method according to still another embodiment of this application.

In an embodiment, as shown in FIG. 6, in a specified time period after a fault of the first port recovers, the packet sending method further includes the following steps.

Step 310. The first network device receives a fourth packet, where a destination IP address of the fourth packet is the IP address of the user-side device.

The specified time period is a time period between a moment at which the fault of the first port recovers and a moment at which learning of an ARP entry for which an egress port is the first port is completed.

The fourth packet includes data to be forwarded to the user-side device.

Step 320: The first network device modifies a destination MAC address of the fourth packet to the MAC address of the second network device based on the first preset ARP entry to obtain a fifth packet.

That the first network device modifies the destination MAC address of the fourth packet to the MAC address of the second network device based on the first preset ARP entry includes that the first network device obtains the MAC address of the second network device from the first preset ARP entry, and then the first network device modifies the destination MAC address of the fourth packet to the MAC address of the second network device.

Step 330: The first network device sends the fifth packet to the second network device through the second port, where the fifth packet is used for the second network device to obtain a sixth packet based on the fifth packet and send the sixth packet to the user-side device, a destination MAC address of the sixth packet is the MAC address of the user-side device, and a destination IP address of the fifth packet is the IP address of the user-side device.

That the fifth packet is used for the second network device to obtain a sixth packet based on the fifth packet includes that after receiving the fifth packet, the second network device detects that a destination MAC address of the fifth packet is the MAC address of the second network device, and determines that the second network device needs to perform layer 3 forwarding. Then, the second network device obtains the destination IP address of the fifth packet, namely, the IP address of the user-side device, and performs IP address resolution to obtain the MAC address of the user-side device. To be specific, the second network device obtains the MAC address of the user-side device based on the IP address of the user-side device. Finally, the second network device modifies the destination MAC address of the fifth packet to the MAC address of the user-side device, to obtain the sixth packet.

In this application, the MAC address of the fifth packet is set to be the MAC address of the second network device, and when receiving the fifth packet sent by the first network device, the second network device needs to perform layer 3 forwarding, instead of layer 2 forwarding. In this way, the data continues to be forwarded to the user-side device using a standby link in an active-link fault recovering process. Therefore, this overcomes a disadvantage of packet loss caused because the second network device cannot perform layer 2 forwarding in the active-link fault recovering process.

In an embodiment, the second packet, the third packet, the fifth packet, and/or the sixth packet further include a virtual local area network identifier, and the virtual local area network identifier includes an identifier of a virtual local area network to which the user-side device belongs. Further, when the first port is a logical layer 3 master interface, the virtual local area network identifier in the second packet, the third packet, the fifth packet, and/or the sixth packet further includes a type identifier of the first port. The type identifier is used to indicate that the first port is a logical layer 3 master interface. In addition, when the first port is a logical layer 3 master interface, the first network device sets a virtual local area network identifier for the first port based on the identifier of the first port, and encapsulates, into the second packet, the third packet, the fifth packet, and/or the sixth packet, the virtual local area network identifier of the first port, the type identifier of the first port, and the identifier of the virtual local area network to which the user-side device belongs. When the first port is a logical layer 3 sub-interface, the first network device sets a virtual local area network identifier for the first port based on the identifier of the first port, and encapsulates, into the second packet, the third packet, the fifth packet, and/or the sixth packet, the virtual local area network identifier of the first port and the identifier of the virtual local area network to which the user-side device belongs.

In a specific embodiment, the packet sending method provided in this application includes the following steps.

Step 1: On a network formed using an M-LAG technology, a multichassis link aggregation device records all M-LAG ports of the device, and records a peer-link port corresponding to each M-LAG port.

Step 2: The multichassis link aggregation device generates ARP entries of corresponding peer-link ports by learning ARP entries of all the M-LAG ports of the device. That is, for an ARP entry (the second preset ARP entry) of each M-LAG port, the device correspondingly generates a backup ARP entry (the first preset ARP entry) of a peer-link port.

Step 3: The multichassis link aggregation device delivers the ARP entries of all the M-LAG ports and ARP entries of all the peer-link ports of the device to hardware.

Figure 8:
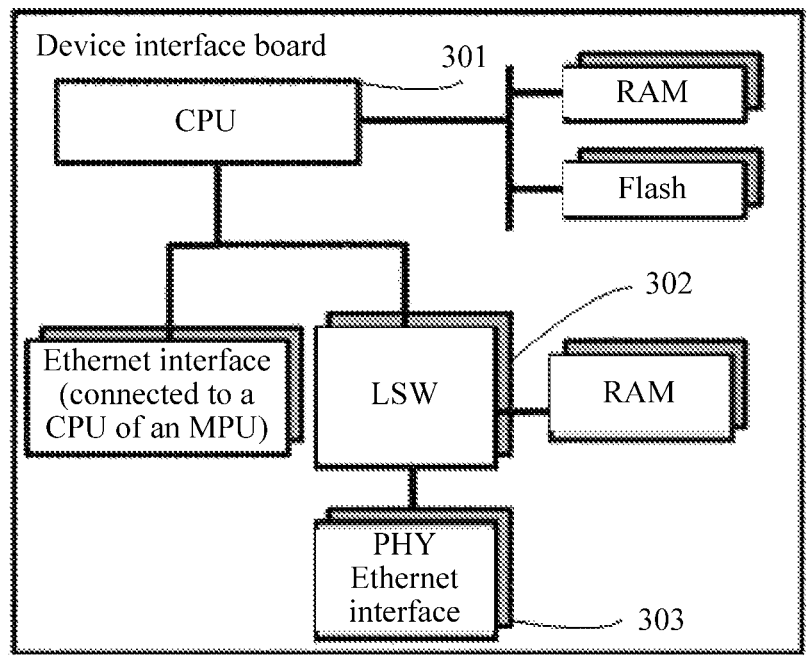
FIG. 8 shows an example of a block diagram of a network device according to an embodiment of this application.

Further, the multichassis link aggregation device delivers all the ARP entries to an Ethernet switch chip (local area network (LAN) Switch (LSW)) of the multichassis link aggregation device. As shown in FIG. 8, the LSW 302 is configured to receive ARP entry data from a central processing unit (CPU) 301 of the multichassis link aggregation device, and then store the ARP entry data in a hardware. The LSW searches the ARP entries based on a received packet, and then modifies the received packet based on an obtained ARP entry, and sends the modified packet to complete data forwarding. In this embodiment, all the ARP entries are delivered to the hardware such that the CPU is not required for packet modification and forwarding. This not only improves forwarding efficiency, but also saves CPU resources.

The CPU of the multichassis link aggregation device is configured to generate the ARP entries of all the M-LAG ports and the peer-link ports, and deliver the ARP entries to the LSW, and control the LSW to perform initialization, service entry delivery, and packet sending and reception.

As shown in FIG. 8, the LSW 302 further has a physical-layer (PHY) Ethernet interface 303, and an optical interface or an electrical interface of the LSW 302 is connected to an interface of the Ethernet using the PHY Ethernet interface 303, that is, is connected to a hardware interface for data forwarding.

Step 4: When data can be normally forwarded on both an active link and a standby link, a packet is forwarded using the active link. When a CPU of the multichassis link aggregation device detects that the active link becomes faulty, the CPU quickly instructs an LSW to switch a data forwarding link to a standby link that is already delivered. This saves a learning process for an ARP entry of a peer-link port of the standby link, and avoids packet loss in the learning process for the ARP entry of the peer-link port. Therefore, data forwarding reliability is improved.

In step 4, for a packet or data that needs to be forwarded using the standby link, that is, a packet with an egress port being a peer-link port, a destination MAC address of the packet needs to be modified. A destination MAC address of the modified packet is a MAC address of a multichassis link aggregation device for packet forwarding. The packet also includes the IP address of the user-side device, and the IP address of the user-side device is used as a destination IP address of the packet. In this way, when the CPU of the multichassis link aggregation device perceives that an M-LAG port of the device becomes faulty, packet or data forwarding is switched to the standby link. After traffic arrives at the multichassis link aggregation device for data forwarding, the traffic is forwarded at layer 3, instead of being isolated at a layer 2 and interrupted. This overcomes a disadvantage of downlink packet loss caused because the multichassis link aggregation device for data forwarding cannot perform layer 2 forwarding when a fault of the active link recovers.

In this embodiment, when the active link becomes faulty, that is, when dual-homed becomes single-homed, packet or data packet forwarding can be quickly switched to the standby link, and switching performance is unrelated to a quantity of to-be-learned ARP entries. This effectively reduces a quantity of lost data packets. In addition, when the fault of the active link recovers, that is, when single-homed becomes dual-homed, the multichassis link aggregation device for packet or data forwarding can switch back to the active link without packet loss while ensuring no layer 2 loop. Therefore, this improves packet or data transmission reliability in M-LAG networking, and reduces packet loss time in two scenarios of dual-homed-to-single-homed and single-homed-to-dual-homed in M-LAG networking, that is, reduces a quantity of lost data packets in the two scenarios of dual-homed-to-single-homed and single-homed-to-dual-homed.

Figure 7:
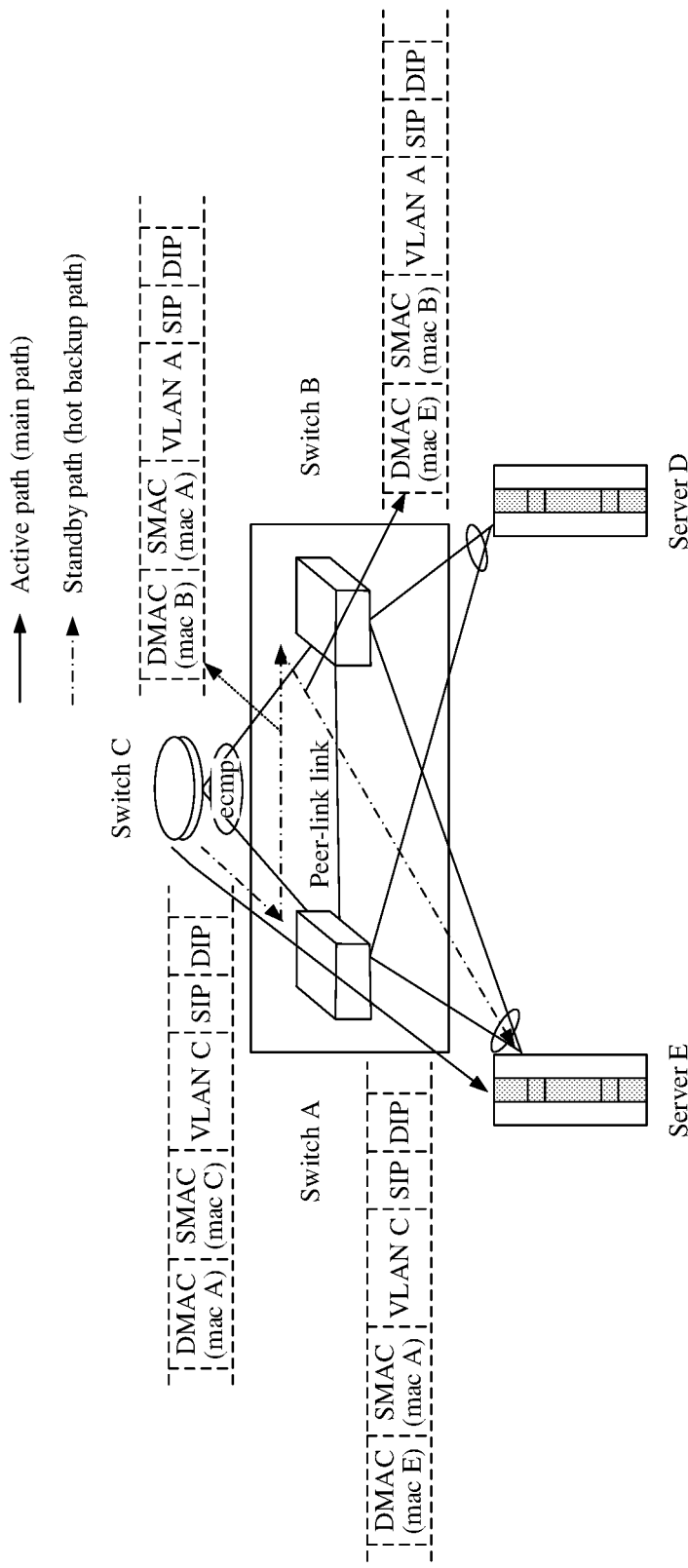
FIG. 7 shows an example of a schematic diagram of data forwarding in a packet sending method according to still another embodiment of this application.

In another specific embodiment, as shown in FIG. 7, on a network to which an M-LAG technology is applied, a switch A and a switch B are multichassis link aggregation devices, and the two devices form active-active gateways. A server E and a server D are user-side devices. A port, connected to the server E, of the switch A is an M-LAG port, and a port, connected to the server D, of the switch B is an M-LAG port. The switch A and the switch B are connected using a peer link. Ports, connected to the peer link, of the switch A and the switch B are both peer-link ports. A link between the switch A and the server E is an active link (main path), and the peer link between the switch A and the switch B and a link between the switch B and the server D are standby links (hot backup path).

Both the switch A and the switch B can implement the packet sending method provided in this application. The following describes a specific implementation process of the packet sending method provided in this application using an example in which a first network device is the switch A and a user-side device is the server E. The method includes the following steps.

Step 1: Switch A collects information based on network topology, saves a peer-link port and an M-LAG port that are of the switch A, and saves a MAC address of a network device (namely, the switch B) belonging to a same M-LAG.

Step 2: The switch A learns a corresponding ARP entry of the server E by sending an ARP request including an IP address of the server E. The switch A learns, on the M-LAG port of the switch A, the ARP entry (the second preset ARP entry) corresponding to the server E, and sends the learned ARP entry to a hardware forwarding layer of the switch A. Further, the switch A determines whether a port in the ARP entry corresponding to the server E is an M-LAG port. If the port in the ARP entry corresponding to the server E is an M-LAG port, the switch A further generates an ARP entry (the first preset ARP entry) of a peer-link port corresponding to the server E. The ARP entry of the peer-link port corresponding to the server E includes the IP address of the server E, a MAC address of the switch B, and an identifier of the peer-link port.

Step 3: When an active link (namely, a link between the switch A and the server E) becomes faulty, the switch A modifies a destination MAC address of the packet to a MAC address of the switch B when receiving a packet destined for the server E and sent by the switch C.

Step 4: As shown in FIG. 7, the switch A modifies a VLAN identifier included in the packet. For example, a VLAN identifier carried in the packet sent by the switch C is VLAN C. The M-LAG port of the switch A is a member of a VLAN A. Before sending the packet to the switch B, the switch A modifies the VLAN identifier VLAN C in the packet received from the switch C to VLAN A.

Step 5: As shown in FIG. 7, the switch A sends the modified packet to the switch B using the peer-link port. After receiving the modified packet, the switch B searches a routing table based on a destination IP (also referred to as DIP) address in the modified packet, for example, the IP address of the server E, and performs layer 3 forwarding.

In this embodiment, when the active link becomes faulty, the switch A may forward the packet to the switch B based on a pre-generated ARP entry, without a need to wait until the ARP entry corresponding to the server E is learned using the peer-link port, thereby avoiding loss of packets destined for the server E.

Figure 9:
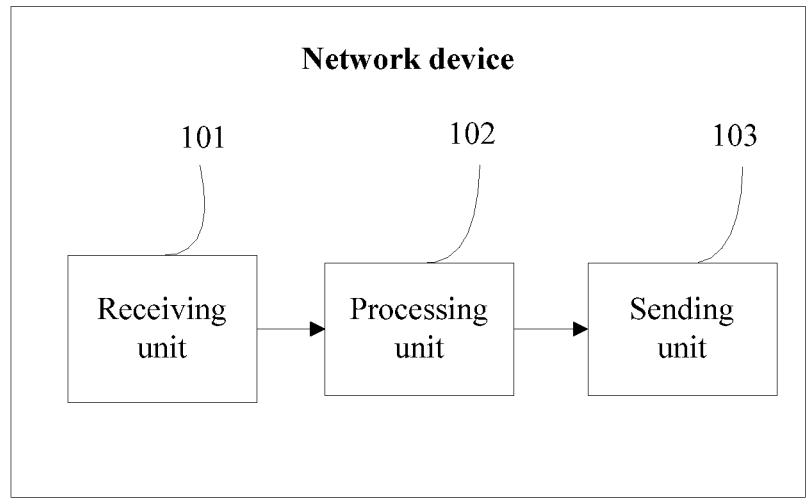
FIG. 9 shows an example of a block diagram of a network device according to another embodiment of this application.

Corresponding to the packet sending method in the foregoing embodiment, an embodiment provides a network device. The network device is a device in a multichassis link aggregation group, and the multichassis link aggregation group further includes another network device. The network device is connected to a user-side device using a first port, and the network device is connected to the other network device using a second port. As shown in FIG. 9, the network device in this embodiment includes a receiving unit 101 configured to receive a first packet, where a destination IP address of the first packet is an IP address of the user-side device, a processing unit 102 configured to, when the first port becomes faulty, modify a destination MAC address of the first packet to a MAC address of the other network device based on a first preset ARP entry of the user-side device to obtain a second packet, where the first preset ARP entry includes the MAC address of the other network device, and a sending unit 103 configured to send the second packet to the other network device through the second port, where the second packet is used for the other network device to obtain a third packet based on the second packet and send the third packet to the user-side device, and a destination MAC address of the third packet is a MAC address of the user-side device.

The network device in this embodiment has configured the first preset ARP entry for the user-side device before the active link becomes faulty. In this way, the packet or data may be directly forwarded using the second port and the first preset ARP entry when a fault occurs, without a need to spend time in learning the first preset ARP entry. Therefore, this effectively reduces time of continuing to forward the packet or data using the faulty active link, that is, effectively reduces a quantity of lost data packets. In addition, the first preset ARP entry stores the MAC address of the other network device. Therefore, after receiving the packet or the data forwarded by the network device, the second device performs layer 3 forwarding. This avoids a disadvantage of packet loss caused by layer 2 forwarding in an active-link fault recovery process.

In an embodiment, before the receiving unit 101 receives the first packet, the processing unit 102 is further configured to generate a second preset ARP entry of the user-side device, where the second preset ARP entry includes the IP address of the user-side device, the MAC address of the user-side device, and an identifier of the first port, and determine whether the first port is a member port of the multichassis link aggregation group, and when the first port is a member port of the multichassis link aggregation group, generate the first preset ARP entry based on the second preset ARP entry, where the first preset ARP entry further includes the IP address of the user-side device and an identifier of the second port.

In an embodiment, the receiving unit 101 is further configured to receive a fourth packet in a specified time period after a fault of the first port recovers, where a destination IP address of the fourth packet is the IP address of the user-side device.

The processing unit 102 is further configured to modify a destination MAC address of the fourth packet to the MAC address of the other network device based on the first preset ARP entry, to obtain a fifth packet.

The sending unit 103 is further configured to send the fifth packet to the other network device using the second port, where the fifth packet is used for the other network device to obtain a sixth packet based on the fifth packet and send the sixth packet to the user-side device, and a destination MAC address of the sixth packet is the MAC address of the user-side device.

It should be noted that steps of the method in the embodiments of this application are in a one-to-one correspondence with steps executed by the network device in this embodiment of this application. Therefore, for repeated steps, details are not repeated.

Figure 10:
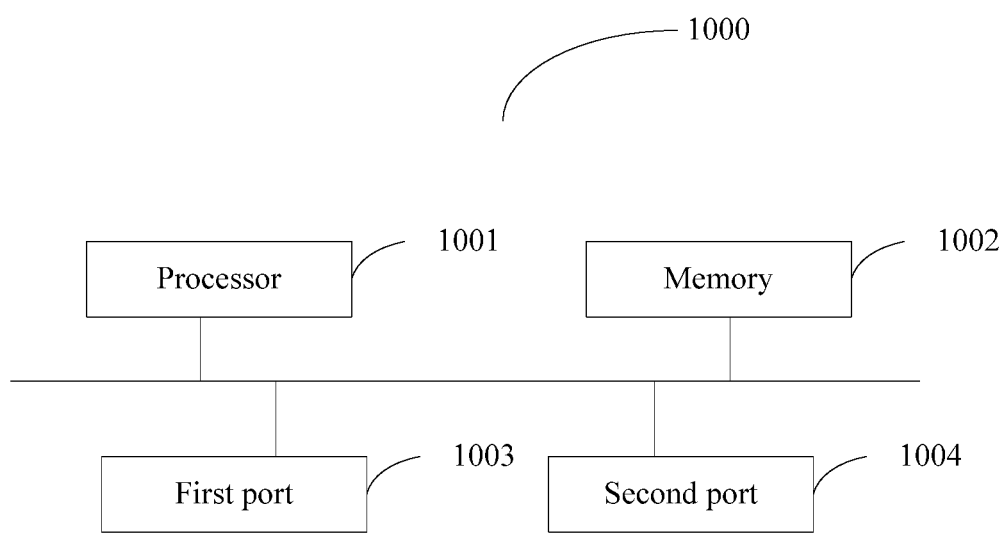
FIG. 10 shows an example of a block diagram of a network device according to still another embodiment of this application.

Referring to FIG. 10, this application further provides another network device 1000. The network device 1000 may be the network device in any of the foregoing embodiments, and is configured to implement the methods in the foregoing embodiments.

The network device 1000 may include a processor 1001, a memory 1002, a first port 1003, and a second port 1004. The first port 1003 is connected to a user-side device. The second port 1004 is connected to another network device in a multichassis link aggregation group.

The processor 1001 is a control center of the network device 1000. The processor 1001 uses various interfaces and lines to connect parts of the entire network device, and performs various functions of the network device and/or processes data by running or executing a software program and/or module stored in the memory 1002 and invoking data stored in the memory 1002. The processor 1001 may be a CPU, a network processor (NP), or a combination of a CPU and an NP. The processor 1001 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof.

The memory 1002 may include a volatile memory such as a random access memory (RAM), or may include a non-volatile memory such as a flash memory, a hard disk drive (HDD), or a solid-state drive (SSD). The memory 1002 may alternatively include a combination of the foregoing types of memories. The memory 1002 may store a program or code. The processor 1001 may implement functions of the network device 1000 by executing the program or code.

This application further provides a computer storage medium. The computer storage medium may store a program, and when the program is executed, some or all of the steps of the embodiments of the packet sending method provided in this application may be performed. The storage medium may be a magnetic disk, an optical disc, a read-only memory (ROM), a RAM, or the like.

This application further provides a computer program product including instructions. When the computer program product runs on a computer, the computer performs the methods described in the foregoing embodiments.

In conclusion, according to the packet sending method or the network device in the embodiments of this application, the standby link is pre-constructed, that is, the first preset ARP entry is set in advance such that data can be quickly switched to the standby link when the active link becomes faulty, thereby reducing interruption time for data forwarding. In addition, a packet forwarded on the standby link is modified such that packet loss caused by link blocking in a layer 2 forwarding mechanism can be avoided for the packet, and no data packet is lost in the active-link fault recovery process, thereby improving data transmission reliability.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A packet sending method, comprising:
   receiving, by a first network device in a multichassis link aggregation group, a first packet, wherein a destination Internet Protocol (IP) address of the first packet is an IP address of a user-side device, and wherein the first network device is coupled to the user-side device using a first port;
   modifying, by the first network device, a destination media access control (MAC) address of the first packet to a MAC address of a second network device in the multichassis link aggregation group based on a first preset Address Resolution Protocol (ARP) entry of the user-side device to obtain a second packet when the first port becomes faulty, wherein the first network device is coupled to the second network device using a second port, and wherein the first preset ARP entry comprises the MAC address of the second network device; and
   sending, by the first network device, the second packet to the second network device through the second port, wherein the second packet is used for the second network device to obtain a third packet based on the second packet and to send the third packet to the user-side device, and wherein a destination MAC address of the third packet is a MAC address of the user-side device.

2. The packet sending method of claim 1, wherein before receiving the first packet, the packet sending method further comprises:
   generating, by the first network device, a second preset ARP entry of the user-side device, wherein the second preset ARP entry comprises the IP address of the user-side device, the MAC address of the user-side device, and an identifier of the first port; and
   generating, by the first network device, the first preset ARP entry based on the second preset ARP entry when the first network device determines that the first port is a member port of the multichassis link aggregation group, wherein the first preset ARP entry further comprises the IP address of the user-side device and an identifier of the second port.

3. The packet sending method of claim 1, wherein the first port becoming faulty comprises that the first port itself becomes faulty.

4. The packet sending method of claim 1, wherein the first port becoming faulty comprises a link between the first port and the user-side device becomes faulty.

5. The packet sending method of claim 1, further comprising:
   receiving, by the first network device, a fourth packet in a specified time period after a fault of the first port recovers, wherein a destination IP address of the fourth packet is the IP address of the user-side device;
   modifying, by the first network device, a destination MAC address of the fourth packet to the MAC address of the second network device based on the first preset ARP entry to obtain a fifth packet; and
   sending, by the first network device, the fifth packet to the second network device through the second port, wherein the fifth packet is used for the second network device to obtain a sixth packet based on the fifth packet and to send the sixth packet to the user-side device, and wherein a destination MAC address of the sixth packet is the MAC address of the user-side device.

6. The packet sending method of claim 2, wherein the first port becoming faulty comprises that the first port itself becomes faulty.

7. The packet sending method of claim 2, wherein the first port becoming faulty comprises a link between the first port and the user-side device becomes faulty.

8. The packet sending method of claim 2, further comprising:
   receiving, by the first network device, a fourth packet in a specified time period after a fault of the first port recovers, wherein a destination IP address of the fourth packet is the IP address of the user-side device;
   modifying, by the first network device, a destination MAC address of the fourth packet to the MAC address of the second network device based on the first preset ARP entry to obtain a fifth packet; and
   sending, by the first network device, the fifth packet to the second network device through the second port, wherein the fifth packet is used for the second network device to obtain a sixth packet based on the fifth packet and to send the sixth packet to the user-side device, and wherein a destination MAC address of the sixth packet is the MAC address of the user-side device.

9. A network device, wherein the network device is a first network device in a multichassis link aggregation group, and wherein the network device comprises:
   a first port configured to couple to a user-side device;
   a second port configured to couple to a second network device in the multichassis link aggregation group;

a memory configured to store a program code; and a processor coupled to the memory and configured to invoke the program code to enable the first network device to be configured to:

receive a first packet, wherein a destination Internet Protocol (IP) address of the first packet is an IP address of the user-side device;

modify a destination media access control (MAC) address of the first packet to a MAC address of the second network device based on a first preset Address Resolution Protocol (ARP) entry of the user-side device to obtain a second packet when the first port becomes faulty, wherein the first preset ARP entry comprises the MAC address of the second network device; and send the second packet to the second network device through the second port, wherein the second packet is used for the second network device to obtain a third packet based on the second packet and to send the third packet to the user-side device, and wherein a destination MAC address of the third packet is a MAC address of the user-side device.

10. The network device of claim 9, wherein before receiving the first packet, the processor is further configured to invoke the program code to enable the first network device to be configured to:

generate a second preset ARP entry of the user-side device, wherein the second preset ARP entry comprises the IP address of the user-side device, the MAC address of the user-side device, and an identifier of the first port; and generate the first preset ARP entry based on the second preset ARP entry when the first port is a member port of the multichassis link aggregation group, wherein the first preset ARP entry further comprises the IP address of the user-side device and an identifier of the second port.

11. The network device of claim 9, wherein the first port becoming faulty comprises that the first port itself becomes faulty or a link between the first port and the user-side device becomes faulty.

12. The network device of claim 9, wherein the processor is further configured to invoke the program code to enable the first network device to be configured to:

receive a fourth packet in a specified time period after a fault of the first port recovers, wherein a destination IP address of the fourth packet is the IP address of the user-side device;

modify a destination MAC address of the fourth packet to the MAC address of the second network device based on the first preset ARP entry to obtain a fifth packet; and send the fifth packet to the second network device through the second port, wherein the fifth packet is used for the second network device to obtain a sixth packet based on the fifth packet and to send the sixth packet to the user-side device, and wherein a destination MAC address of the sixth packet is the MAC address of the user-side device.

13. The network device of claim 10, wherein the first port becoming faulty comprises that the first port itself becomes faulty or a link between the first port and the user-side device becomes faulty.

14. The network device of claim 10, wherein the processor is further configured to invoke the program code to enable the first network device to be configured to:

receive a fourth packet in a specified time period after a fault of the first port recovers, wherein a destination IP address of the fourth packet is the IP address of the user-side device;

modify a destination MAC address of the fourth packet to the MAC address of the second network device based on the first preset ARP entry to obtain a fifth packet; and send the fifth packet to the second network device through the second port, wherein the fifth packet is used for the second network device to obtain a sixth packet based on the fifth packet and to send the sixth packet to the user-side device, and wherein a destination MAC address of the sixth packet is the MAC address of the user-side device.

15. A computer program product comprising a non-transitory computer readable storage medium storing a program code thereon for packet sending, wherein a first network device in a multichassis link aggregation group configured to invoke the program code, and wherein the program code causes the first network device to be configured to:

receive a first packet, wherein a destination Internet Protocol (IP) address of the first packet is an IP address of a user-side device;

modify a destination media access control (MAC) address of the first packet to a MAC address of a second network device in the multichassis link aggregation group based on a first preset Address Resolution Protocol (ARP) entry of the user-side device to obtain a second packet when a first port becomes faulty, wherein the first preset ARP entry comprises the MAC address of the second network device; and send the second packet to the second network device through a second port, wherein the second packet is used for the second network device to obtain a third packet based on the second packet and to send the third packet to the user-side device, and wherein a destination MAC address of the third packet is a MAC address of the user-side device.

16. The computer program product of claim 15, wherein before receiving the first packet, the program code further causes the first network device to be configured to:

generate a second preset ARP entry of the user-side device, wherein the second preset ARP entry comprises the IP address of the user-side device, the MAC address of the user-side device, and an identifier of the first port; and generate the first preset ARP entry based on the second preset ARP entry when the first port is a member port of the multichassis link aggregation group, wherein the first preset ARP entry further comprises the IP address of the user-side device and an identifier of the second port.

17. The computer program product of claim 15, wherein the first port becoming faulty comprises that the first port itself becomes faulty or a link between the first port and the user-side device becomes faulty.

18. The computer program product of claim 15, wherein the program code further causes the first network device to be configured to:

receive a fourth packet in a specified time period after a fault of the first port recovers, wherein a destination IP address of the fourth packet is the IP address of the user-side device;

modify a destination MAC address of the fourth packet to the MAC address of the second network device based on the first preset ARP entry to obtain a fifth packet; and send the fifth packet to the second network device through the second port, wherein the fifth packet is used for the second network device to obtain a sixth packet based on the fifth packet and to send the sixth packet to the user-side device, and wherein a destination MAC address of the sixth packet is the MAC address of the user-side device.

19. The computer program product of claim 16, wherein the first port becoming faulty comprises that the first port itself becomes faulty or a link between the first port and the user-side device becomes faulty.

20. The computer program product of claim 16, wherein the program code further causes the first network device to be configured to:
  receive a fourth packet in a specified time period after a fault of the first port recovers, wherein a destination IP address of the fourth packet is the IP address of the user-side device;
  modify a destination MAC address of the fourth packet to the MAC address of the second network device based on the first preset ARP entry to obtain a fifth packet; and
  send the fifth packet to the second network device through the second port, wherein the fifth packet is used for the second network device to obtain a sixth packet based on the fifth packet and to send the sixth packet to the user-side device, and wherein a destination MAC address of the sixth packet is the MAC address of the user-side device.

\* \* \* \* \*